United States Patent Office 3,495,621
Patented Feb. 17, 1970

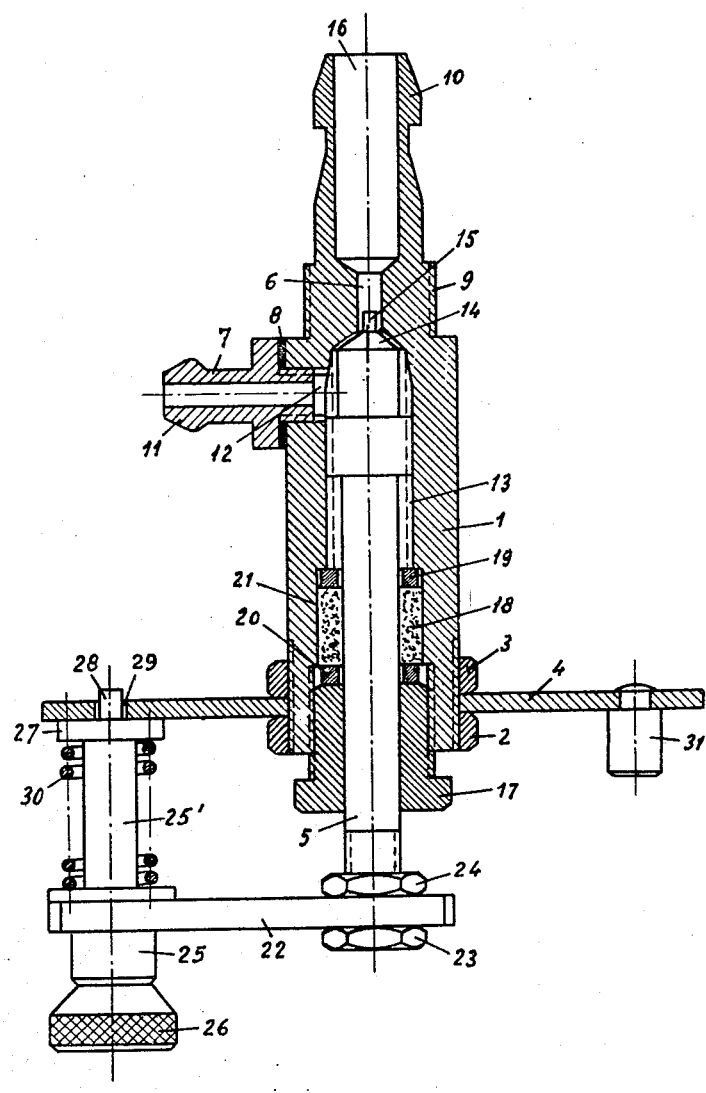

3,495,621
TIME INTERVAL REGULATOR FOR A DETONATING GUN SCARECROW
Gabriel Alphonse Verbrugge, 130 Markegemstraat, Wakken, Belgium
Filed Dec. 22, 1966, Ser. No. 603,802
Claims priority, application Belgium, Dec. 31, 1965, 674,623
Int. Cl. F16k 21/06, 31/48
U.S. Cl. 137—553                    1 Claim

ABSTRACT OF THE DISCLOSURE

A time interval regulator for detonating a gun scarecrow regulates the flow rate of a gas to the detonator and hence the interval between detonations. A special gas-regulating valve is controlled by a rotatable handle having a spring-urged stem selectively engageable in any of a plurality of peripherally spaced holes in a disk corresponding to different open positions of the valve.

---

The invention relates to a time interval regulator for a detonating gun scarecrow.

The object of the invention is to provide a mechanism by means of which the interval between two successive explosions in a detonating gun scarecrow may be accurately adjusted in a very simple manner.

For that purpose, the time interval regulator according to the invention comprises a cylinder communicating with a gas supply and exhaust and wherein a stem may be moved, by the rotation thereof, coaxially with reference to the cylinders, along the longitudinal axis of the cylinder, in such a manner that at one end of the stem, an exhaust port for the gas to be exploded may be opened in full or shut tight by the head of the stem, the opposite end of the stem being provided with a small handle by means of which the stem may be rotated and allowing the reading off on a disk, with reference to which the handle is rotated, of the opening position of the said exhaust port.

In an advantageous manner the said stem is threaded and cooperates with a thread tapped inside the cylinder.

A feature of the invention is the fact that a small stem is fitted on the said handle, at right angles to the plane of the said disk, stem the extremity whereof may under a spring load, enter one of the small bores provided in this disk.

Other details and advantages of the invention will become apparent fromt he description given hereinafter of a time interval regulator for a detonating gun scarecrow; this description is only give by way of example and does not limit the invention; reference numerals relate to the accompanying drawings.

FIGURE 2 shows a sectional view along the line II—II of FIGURE 1.

In the figures, the same reference numerals refer to the same elements.

Figure 1:
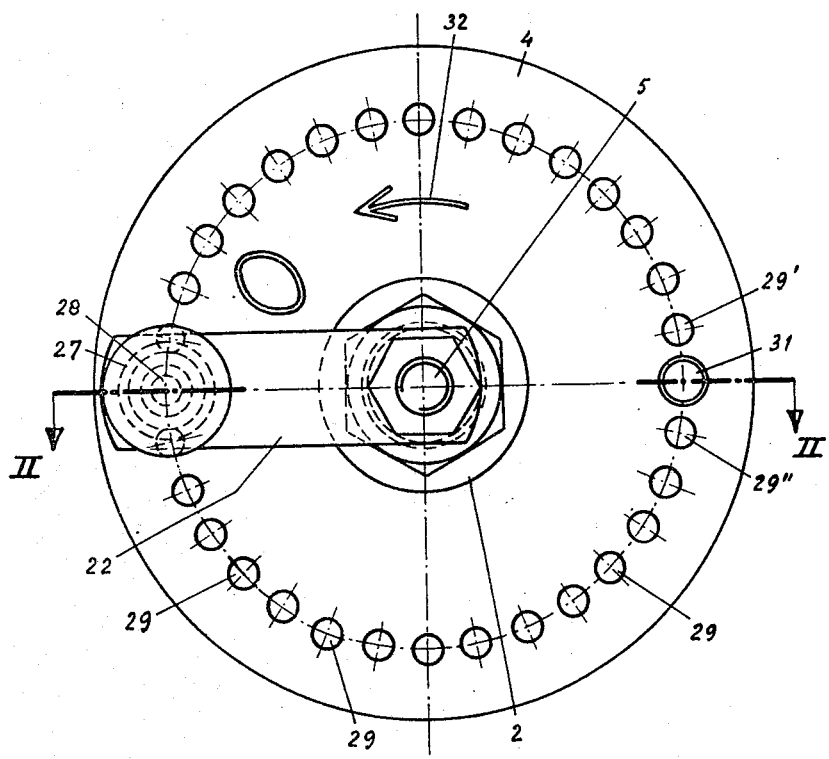
FIGURE 1 is a front view of a time interval regulator for a detonating gun scarecrow according to the invention.

The time interval regulator comprises essentially a cylinder 1, fastened by means of a nut 2, with counternut 3, to a disk 4, and a stem 5 provided inside the cyinder 1. The head of this stem has to adjust the opening of port 6 for the gas. At the end of cylinder 1 located opposite to the extremity on which is mounted disk 4 has been cut a thread 9, in order to enable the time interval regulator to be fastened on the actual detonating gun. Between the threaded portion on which are screwed the nuts 2 and 3 and the threaded portion 9 is provided an orifice 12 in the cylinder 1, orifice wherein has been tapped a thread. Inside the orifice 12 has been screwed the small inlet tube 7. The inlet tube 7 is screwed on the cylinder 1, by means of a gasket 8. Beyond the thread 9, the cylinder 1 ends in the shape of a head 10 in order to achieve a sealed connection with a rubber exhaust tube. For the same purpose the small supply pipe 7 ends in a head 11. The stem 5 is screwed inside the bore 13 of the cylinder 1. The free end 14 of the stem 5 is cone shaped and ends in a cylindrical head 15. When this cylindrical head enters more or less far the small channel 6, the flow of gas is proportionally diminished or increased. Full closure is achieved by applying the oblique face 14 against the corresponding seat.

A hollow plug 17 with outside thread applies, against the internal wall 21 of the bore of cylinder 1, the gasket 18 of plastic material provided between the metal rings 19 and 20. The end of the stem 5, which projects from the cylinder through the hollow plug 17, is provided with a thread in order to fasten on to the said stem a handle 22, locked between the nut 23 and the counter-nut 24. Through the other end of the handle 22 is drilled a hole through which may slide te narrow portion 25' of a stem 25. This stem 25 is provided at one end with a circular head 26 and, at the other end, with a circular stop 27; beyond this stop 27, the stem 25 has a point 28 adapting itself in the small bores 29 of disk 4.

A spiral spring 30, provided between the handle 22 and the stop 27 applies the latter continuously against the disk 4. In one of the bores 29 is provided a rivet-shaped stop 31, so that the handle 22 may only carry out one rotation as the point 28 cannot get past this rivet 31.

Rotating handle 22 will result in screwing or unscrewing stem 5. When the handle 22 has rotated in such a manner that point 28 fits bore 29' of disk 4, stem 5 is fully screwed home and the gas is therefore unable to flow from the supply pipe 7 to the exhaust port 16. When the handle is rotated in the direction of arrow 32, stem 5 is unscrewed and there will therefore be available a more or less large passage 6 which will be largest when the point 28 enters bore 29". The size of the said passage 6 conditions the magnitude of the flow of gas and consequently the time interval between two successive detonations of the scarecrow.

The stem 5, the cylinder 1, the supply pipe 7 and the nuts 2, 3, 23 and 24 as well as the rings 19 and 20 are preferably produced from a copper alloy.

I claim:
1. A time interval regulator for a detonating gun scarecrow, comprising a cylinder, means for supplying gas to said cylinder, a first stem screw-threadedly disposed in the cylinder and rotatable to advance and retract the first stem along the longitudinal axis of the cylinder, said cylinder having an exhaust port for gas to be exploded in said gun, said first stem at one end being movable relative to said exhaust port to regulate the size of the opening of said exhaust port and hence to regulate the gas flow rate through said exhaust port, a handle secured to the other end of said first stem to rotate said first stem to regulate the size of the opening of said exhaust port, a disk secured to said cylinder perpendicular to said first stem, a second stem carried by said handle and spaced from and movable relative to said handle parallel to said first stem, spring means urging said second stem toward said disk, said disk having a plurality of equally spaced holes therein spaced peripherally substantially completely thereabout for the reception and releasable retention of an end of said second stem, a plurality of said recesses corresponding to positions of said first stem in which said exhaust port is open to a plurality of different sizes, and a stop fixedly disposed on said disk for engagement with said second stem to limit rotation of the handle in either direction about the axis of said first stem.

References Cited

UNITED STATES PATENTS

| | | | |
|---|---|---|---|
| 750,539 | 1/1904 | Hiller | 137—553 XR |
| 1,468,172 | 9/1923 | Schulenberg | 137—556 |
| 1,669,844 | 5/1928 | Sparks | 137—556.3 |
| 1,746,055 | 2/1930 | Roberts et al. | 137—556 |
| 3,023,775 | 3/1962 | Becker | 137—553 |

HENRY KLINKSIEK, Primary Examiner